United States Patent
Koyanagi

(10) Patent No.: US 8,269,820 B2
(45) Date of Patent: Sep. 18, 2012

(54) WIDE-ANGLE IMAGE ACQUIRING METHOD AND WIDE-ANGLE STEREO CAMERA DEVICE

(75) Inventor: Hitoshi Koyanagi, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 762 days.

(21) Appl. No.: 12/446,883

(22) PCT Filed: Sep. 22, 2007

(86) PCT No.: PCT/JP2007/068468
§ 371 (c)(1),
(2), (4) Date: Apr. 23, 2009

(87) PCT Pub. No.: WO2008/053649
PCT Pub. Date: May 8, 2008

(65) Prior Publication Data
US 2010/0091090 A1    Apr. 15, 2010

(30) Foreign Application Priority Data
Nov. 2, 2006  (JP) .................................. 2006-299208

(51) Int. Cl.
*H04N 13/02* (2006.01)
(52) U.S. Cl. .................................. 348/47; 348/E13.002
(58) Field of Classification Search ............. 348/40–41, 348/47–52, E13.001–E13.004; 382/154
See application file for complete search history.

(56) References Cited

U.S. PATENT DOCUMENTS

| | | | |
|---|---|---|---|
| 5,986,668 A * | 11/1999 | Szeliski et al. ................ | 345/634 |
| 6,011,863 A * | 1/2000 | Roy .............................. | 382/154 |
| 6,175,648 B1 * | 1/2001 | Ayache et al. ................ | 382/154 |
| 6,608,923 B1 * | 8/2003 | Zhang et al. .................. | 382/154 |
| 6,671,399 B1 * | 12/2003 | Berestov ........................ | 382/154 |
| 6,674,892 B1 * | 1/2004 | Melen ........................... | 382/154 |
| 6,677,981 B1 * | 1/2004 | Mancuso et al. ................ | 348/36 |
| 7,103,212 B2 * | 9/2006 | Hager et al. ..................... | 382/154 |
| 7,573,491 B2 * | 8/2009 | Hartkop et al. ................ | 345/672 |
| 2003/0156751 A1* | 8/2003 | Lee et al. ....................... | 382/154 |
| 2005/0219693 A1* | 10/2005 | Hartkop et al. ................ | 359/462 |

(Continued)

FOREIGN PATENT DOCUMENTS
JP         11-083530         3/1999
(Continued)

OTHER PUBLICATIONS

Communication (Reasons for Refusal) issued May 15, 2012 in related Japanese Application Serial No. 2008-542016 (3 pages).

(Continued)

*Primary Examiner* — Brendan Higa
(74) *Attorney, Agent, or Firm* — Lucas & Mercanti, LLP

(57) ABSTRACT

Epipolar lines of first and second images are made consistent with each other in a paralleling step, so that it has the advantages (1) and (2) as set forth in the background section. Further, distortions of the first and second images are corrected in a correcting step, and, even if characters conversion is carried out, it can avoid excessively reduction of central portions in the first and second images or excessively enlargement of side edge portions. Thus, while maintaining of the above mentioned advantages (1) and (2), wide angle image acquiring method and a wide angle stereo camera device which make three-dimensional space holding possible can be provided.

4 Claims, 5 Drawing Sheets

U.S. PATENT DOCUMENTS

| | | | |
|---|---|---|---|
| 2006/0018509 A1* | 1/2006 | Miyoshi et al. | 382/104 |
| 2006/0029256 A1* | 2/2006 | Miyoshi et al. | 382/104 |
| 2006/0193509 A1* | 8/2006 | Criminisi et al. | 382/154 |
| 2008/0058593 A1* | 3/2008 | Gu et al. | 600/109 |
| 2009/0167843 A1* | 7/2009 | Izzat et al. | 348/43 |
| 2010/0329543 A1* | 12/2010 | Li et al. | 382/154 |

FOREIGN PATENT DOCUMENTS

| | | |
|---|---|---|
| JP | 2000-121319 | 4/2000 |
| JP | 2001141422 | 5/2001 |
| JP | 2002-152776 | 5/2002 |
| JP | 2002-359838 | 12/2002 |
| JP | 2005-293038 | 10/2005 |
| JP | 2007295028 | 11/2007 |

OTHER PUBLICATIONS

English language translation of Communication (Reasons for Refusal) issued May 15, 2012 in related Japanese Application Serial No. 2008-542016 (3 pages).

* cited by examiner

WIDE-ANGLE IMAGE ACQUIRING METHOD AND WIDE-ANGLE STEREO CAMERA DEVICE

This is a U.S. National Phase Application under 35 U.S.C. 371 of International Application PCT/JP2007/068468, filed on Sep. 22, 2007, which claims the priority of Japanese Application No. 2006-299208, filed Nov. 2, 2006, the entire content of both Applications are hereby incorporated by reference.

TECHNICAL FIELD

The present invention relates to a wide-angle image acquiring method an which two cameras are used to photograph an object so that a first image and a second image are acquired, whereby a wide-angle image of the object is acquired by the first image and the second image, and to a wide-angle stereo camera device.

BACKGROUND TECHNOLOGY

In recent years, "stereo cameras" have been widely used in various fields, such as robot industries, or the like, due to the fact that the stereo cameras can measure three-dimensional space, and can help to research or identify the object. The stereo camera is structured of two cameras (lenses), each of which is placed at two separated positions to photograph the same object at the same time, whereby the stereo camera can acquire information regarding the depth direction, that is, an image can be acquired from which it is possible to stereoscopically acquire a space, as when a person directly views the object.

Since both cameras are positioned with each other in parallel against the horizontal line, said stereo camera can acquire two advantages.

A first advantage is that when a distance in the depth direction is to be measured, the fundamental principle of triangulation is used, if said distance is represented by Z, said distance Z can be easily acquired by Formula (10), shown below. However, in order to satisfy the relationship shown by Formula (10), both cameras are necessary to be placed parallel to each other, and if either camera is not placed in parallel, very complicated calculations are necessary to be conducted.

$$Z = b/d \times f \qquad (10)$$

In Formula (10), "b" represents the distance between both cameras, "d" represents the positional disagreement on an imaging surface acquired by each camera with respect to the same object, and "f" represents the focal distance.

A second advantage is that within the two separate images photographed by said two cameras, any point on the image photographed by one camera can be easily identified as a corresponding point on the image photographed by the other camera. That is, on the stereo camera, an observing point, which is on the image photographed by one camera, is necessary to be searched on the image photographed by the other camera, as an observing point on the image photographed by the other camera, corresponding to that of the one camera, and a line for said searching is termed as an "Epipolar line". If both cameras are arranged in parallel with each other, said Epipolar lines on one image and the other image are made consistent with each other in a parallel relationship, so that a point, corresponding to the observing point on the image photographed by one camera, is easily searched on the image photographed by the other camera.

However, from a physical point of view, it is very difficult to arrange two cameras to be truly parallel, whereby in recent years, the images photographed by two cameras are processed so that paralleling is established (for example, see Patent Documents 1 and 2).

Patent Document 1: JPA H7-294,215
Patent Document 2: JPA H11-203,476

DISCLOSURE OF THE INVENTION

Problems to be Solved by the Invention

Concerning the above-described stereo camera structured of two separated cameras, each camera represents a pin-hole camera, to photograph an object as an image on a plain surface, whereby if a stereo camera is structured of cameras each having a wide-angle lens, such as a fish-eye lens or the like, though said cameras are possible to acquire a wide-angle image, from which a space can be three-dimensionally acquired, the above described first and second advantages are not sufficiently realized.

That is, concerning the wide-angle lens, such as the fish-eye lens, whose curvature of an object plane is very great, exhibiting a field angle (represented by θ) of 180°, whereby as shown in FIG. 5, though a normal lens exhibits a characteristic of [f tan(θ)], the wide-angle lens exhibits a characteristic of [fθ], for example. An original image, acquired by such a wide-angle lens, is projected on a plane surface, whereby its characteristic is transformed from the characteristic of [fθ] to the characteristic of [f tan (θ)] (see the bold curve in FIG. 5), and when the field angle increases toward 180°, formula [f tan (θ)≈∞] is shown (see the dashed curve in FIG. 5). In more detail, the original image shown in FIG. 6, acquired by the wide-angle lens, changes to the image shown in FIG. 7, due to transformation of the characteristic, and in the image formed after the transformation of the characteristic, which is shown in FIG. 7, the central portion of said image is excessively reduced, while side portions are excessively enlarged. Accordingly, even if a stereo camera is structured of two cameras, each incorporating the wide-angle lens, such as a fish-eye lens, it is very difficult to acquire a wide-angle image from which stereoscopic space is acquirable, while the above described first and second advantages are maintained, because said stereo camera results in abnormal accuracy.

An object of the present invention is to offer a method to acquire a wide-angle image and a wide-angle stereo camera device, which can acquire a wide-angle image, by which the three-dimensional space is acquirable, while maintaining the above-described first and second advantages.

Means to Solve the Problems

The above problems can be solved by the structures listed below.

Structure 1. In a wide-angle image acquiring method, which photographs an object while using a first camera and a second camera, to acquire a first image and a second image, and which acquires a wide-angle image of the object while using the first image and the second image, said wide-angle image acquiring method is characterized in that:

a step of paralleling an Epipolar line of the first image with an Epipolar line of the second image, so that said Epipolar lines are made consistent with each other;

a step of correcting distortions of the first image and the second image, each projected on a cylindrical imaging surface;

a step of searching for a point which corresponds to an observing point on the first image, on the Epipolar line of the second image; and a step of reconstructing a three-dimensional figure of the object, after acquiring distances in a depth direction from the first and the second cameras to the object, based on a searched result of the searching step.

Structure 2. The wide-angle image acquiring method of Structure 1 is characterized in that, in the step of reconstructing the three-dimensional figure of the object, when the distance between the first camera and the object is represented by R1 in a cylindrical coordinate system, said distance R1 is calculated by the formula shown below.

$$R1 = b \times f/d'$$

(In which formula, "b" represents the distance between the first camera and the second camera, "f" represents the focal length of the first camera and the second camera, and "d'" represents the positional disagreement between the first image and the second image.)

Structure 3. The wide-angle image acquiring method of Structure 1, is characterized in that, in the step of reconstructing the three-dimensional figure of the object, when the distance between the first camera and the object is represented by Z2 in an orthogonal coordinate system, said distance Z2 is calculated by the formula shown below.

$$Z2 = R1 \times \sin \theta 1$$

(In which formula, "θ1" represents an angle, viewed from the first camera.

Structure 4. In a wide-angle stereo camera device, which photographs an object to acquire a first image and a second image, while using a first camera and a second camera, and which acquires a wide-angle image of the object, while using the first image and the second image, the wide-angle stereo camera device is characterized in that:

a means for paralleling an Epipolar line of the first image with an Epipolar line of the second image, so that said Epipolar lines are made consistent with each other;

a means for correcting distortions of the first image and the second image, each projected onto an cylindrical imaging surface;

a means for searching a point which is corresponding to an observing point of the first image on the Epipolar line of the second image; and a means for reconstructing a three-dimensional figure of the object, after acquiring distances in the depth direction from the first and the second cameras toward the object, based on a searched result of the searching means.

Structure 5. The wide-angle stereo camera device of Structure 4, is characterized in that the means for reconstructing the three-dimensional figure of the object, when the distance between the first camera and the object is represented by R1 in the cylindrical coordinate system, said distance R1 is calculated by the formula shown below.

$$R1 = b \times f/d'$$

(In which formula, "b" represents the distance between the first camera and the second camera, "f" represents the focal length of the first camera and the second camera, and "d'" represents the positional disagreement between the first image and the second image.)

Structure 6. The wide-angle image acquiring method of Structure 4 is characterized in that: in the means for reconstructing the three-dimensional figure of the object, when the distance between the first camera and the object is represented by Z2 in an orthogonal coordinate system, said distance Z2 is calculated by the formula shown below.

$$Z2 = R1 \times \sin \theta 1$$

(In which formula, "θ1" represents the angle viewed from the first camera.)

Effects of the Invention

Based on the present invention, the Epipolar line of the first image is made consistent with the Epipolar line of the second image in the step of paralleling, whereby said first and second advantages, can be maintained, as detailed in the previous background description, and further, any distortions of the first image and the second image are corrected in the step of correcting, so that, even though the characteristic is transformed, the central portions of the first and the second image are prevented from being excessively reduced, while the side portions are prevented from being excessively enlarged (see FIG. 7), that is, the wide angle image acquiring method for acquiring the three-dimensional space, and the wide angle stereo camera device can be offered, while the above first and second advantages are maintained.

Figure 1:
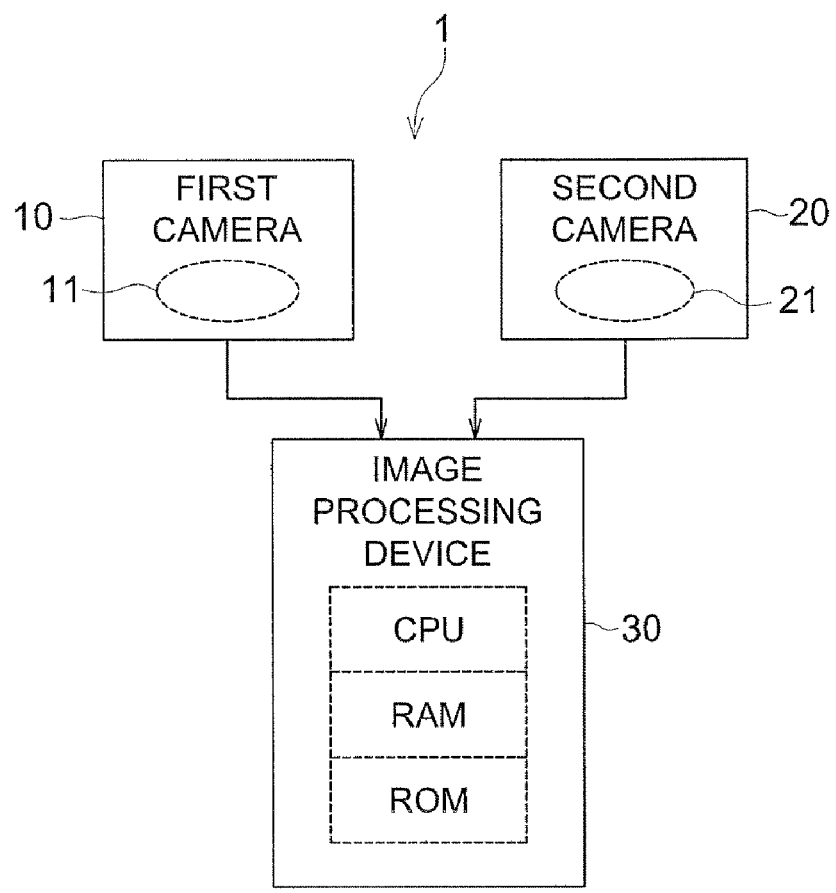
FIG. 1 is a block diagram to show the schematic construction of a wide-angle stereo camera device.

EXPLANATION OF NUMERICAL SYMBOLS 1. wide-angle stereo camera device
10. first camera
11. first lens
20. second camera
21. second lens
12 and 22 image capturing surfaces (which are hemisphere surfaces)
13 and 23 image capturing surfaces (which are cylindrical surfaces) after the correction
14 and 24 image capturing surfaces (which are flat surfaces)
30. image processing device (paralleling means, correcting means, searching means, and reconstructing means)
40. object
41 and 43 first images
42 and 44 second images
EP Epipolar line

DETAILED DESCRIPTION OF THE PREFERRED EMBODIMENT

The best embodiment to realize the present invention will now be detailed, while referring to the drawings. Various limitations, which are technically preferable for the conduction of the present invention, are applied on the embodiments described below, however the scope of the present invention is not limited to the embodiments below nor to the relevant drawings.

Firstly, a wide-angle stereo camera in the present invention will now be detailed. In FIG. 1, wide-angle stereo camera device 1 in the present invention includes two cameras (represented by first camera 10 and second camera 20), and image processing device 30, wherein image processing device 30 is configured to conduct image processing on the images, each acquired by first camera 10 and second camera 20.

First camera 10 and second camera 20, incorporating the same structure between each other, are arranged in parallel, or arranged nearly in parallel, with respect to the horizontal line. First camera 10 has first lens 11, while second camera has second lens 21. First and second lenses 11 and 21 represent well-known wide-angle lenses, such as fish eye lenses, whereby first and second cameras 10 and 20 can capture wide-angle images, while employing said first and second lenses 11 and 21.

Image processing device 30 is structured of a general purpose CPU (which is a Central Processing Unit), RAM (which is a Random Access Memory), ROM (which is a Read Only Memory), and the like electronic devices. Image processing device 30, allows CPU to conduct the calculating process in the RAM, serving as a working area, in accordance with processing programs, stored in ROM, and in more detail, after receiving the images, captured by first and second cameras 10 and 20, image processing device 30 conducts image processing on the images, so that image processing device 30 generates a corrected image, or an image to exhibit information concerning the depth direction (see the later description).

[First Embodiment]

Subsequently, the first embodiment of the "wide-angle image acquiring method" in the present invention will now be detailed.

Figure 2:
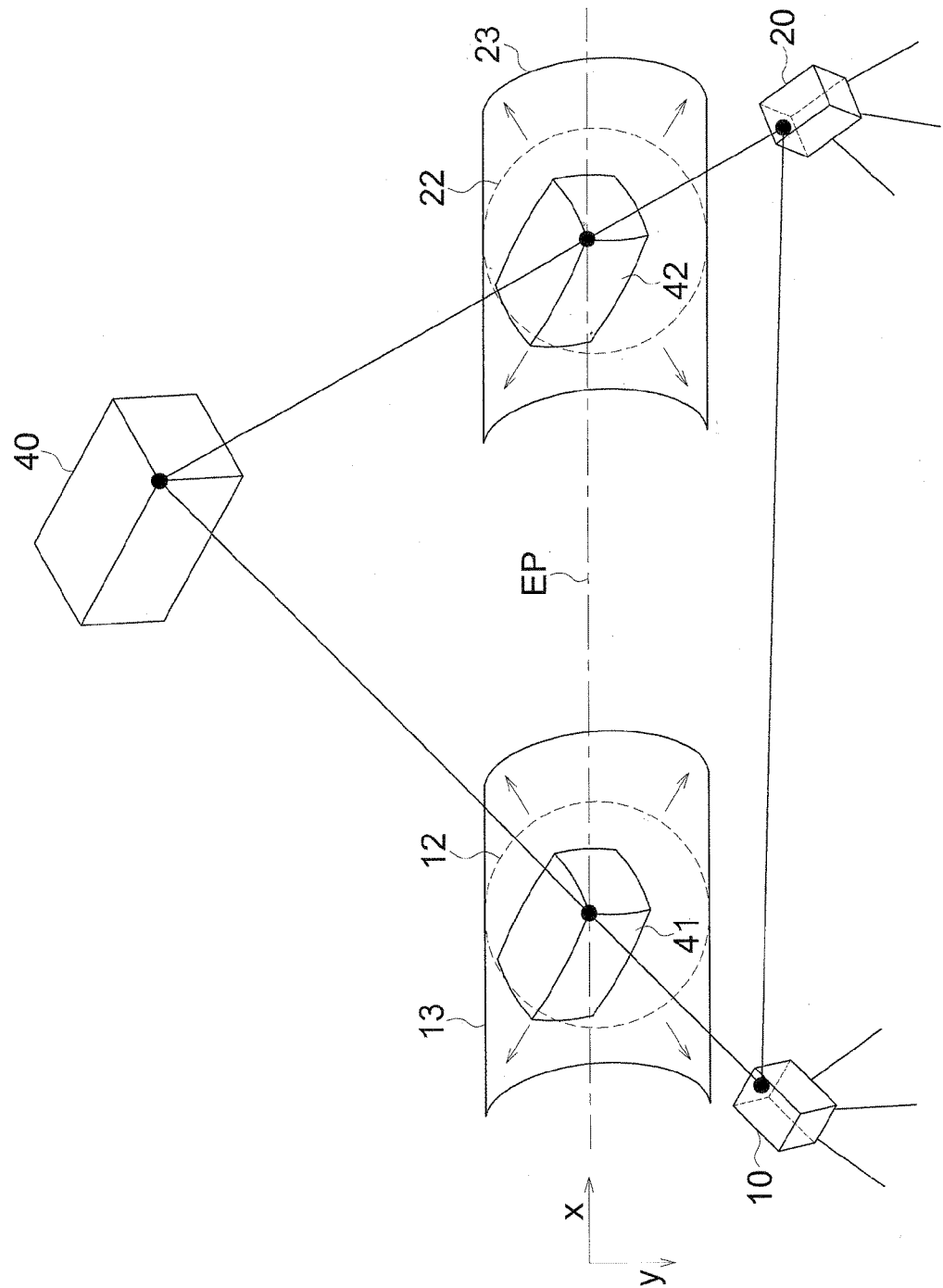
FIG. 2 is a drawing to detail a wide-angle image acquiring method relating to the first embodiment.

As shown in FIG. 2, firstly, object 40 is respectively photographed by first and second cameras 10 and 20, whereby first image 41 is acquired as a photographed result of first camera 10, while second image 42 is acquired as a photographed result of second camera 20 (which represent the image capturing step). After that, image processing device 30, serving as the paralleling means, conducts the coordinate transformation on first image 41 and second image 42, by the well-known matrix operation, so that Epipolar lines EP of first image 41 and second image 42 are made consistent with each other (see the chain line in FIG. 2, being the paralleling step).

Since first image 41 and second image 42 were captured by first and second lenses 11 and 21, each structured of a wide-angle lens exhibiting the characteristic of fθ, first image 41 and second image 42 are represented as images, being projected onto hemisphere image capturing surfaces 12 and 22 (see the dotted line in FIG. 2).

After the process of the paralleling step has been completed, image processing device 30, serving as the correcting means, transforms the coordinates of first and second images 41 and 42 to the coordinates of cylindrical image capturing surfaces 13 and 23, so that any distortions of first and second images 41 and 42 are corrected (see the solid line in FIG. 2, being the correcting step).

In more detail, when the coordinates of first and second images 41 and 42, both being before the correcting step, are represented by [x, y], while the coordinates of first and second images 41 and 42, both being after the correcting step, are represented by [x', y'], coordinates [x, y] are transformed to coordinates [x', y'], based on Formula (1), shown below. As a result, first and second images 41 and 42, having been projected on hemisphere surfaces 12 and 22, can be projected onto cylindrical image capturing surfaces 13 and 23.

[Formula 1]

$$\begin{bmatrix} x' \\ y' \end{bmatrix} = \begin{bmatrix} f\tan\frac{x}{f} \\ y \end{bmatrix} \quad (1)$$

After the correcting step has been completed, in order to acquire the corresponding relationship between corrected first image 41 and corrected second image 42, image processing device 30, serving as the researching means, researches a point which corresponds to the observing point on Epipolar line EP of first image 41, based on corrected first image 41, on Epipolar line EP of corrected second image 42 (which is the researching step). As a result, the amount of positional disagreement between corrected first image 41 and corrected second image 42, which is a value corresponding to "d" shown in Formula (10), can be acquired.

After the process of the searching step has been completed, image processing device 30, serving as the reconstruction means, acquires the distance concerning each observing point on corrected image 41, based on the processed results (which are the searched results) of the researching step, so that a three-dimensional figure of object 40 is reconstructed by both the image capturing result of first camera 10, acquired in the image capturing step, and the image capturing result (being a two dimensional figure of first image 41) of first camera 10 (which is the reconstruction step). As a result, a conclusive wide-angle image can be generated.

Figure 3:
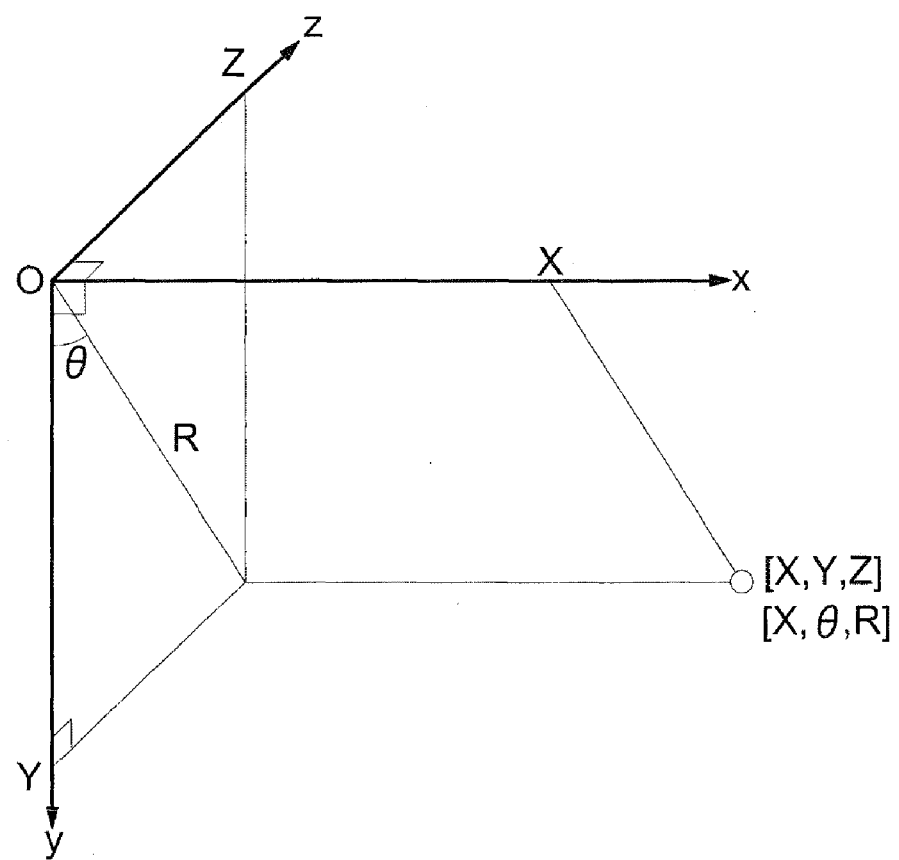
FIG. 3 is a drawing to show coordinates in a cylindrical coordinate system and an orthogonal coordinate system.

In more detail, the three-dimensional coordinates (which are the cylindrical coordinates) of object 40, viewing from first camera 10, are represented by [X1, θ1, R1] (see FIG. 3), each coordinate value is calculated by Formulas (2a)-(2c). "R1" in Formula (2c) represents the distance between object 40 and first camera 10, in the cylindrical coordinate system.

$$X1 = x'/f \times R1 \quad (2a)$$

$$\theta 1 = y'/f \quad (2b)$$

$$R1 = b \times f/d' \quad (2c)$$

In which formulas, "x'" and "y'" represent corrected coordinate values, "f" represents the focal length of both first and second lenses 11 and 12 of first and second cameras 10 and 20, "b" represents the distance between first camera 10 and second camera 20, and "d'" represents the amount of positional disagreement between corrected first image 41 and corrected second image 42.

When said cylindrical coordinates [X1, θ1, R1] are to be shown by the normal orthogonal coordinates (see FIG. 3), each coordinate value is calculated by Formulas (3a)-(3c), which are shown below. "Z2" in Formula (3c) represents the distance between object 40 and first camera 10, in the orthogonal coordinates.

$$X2 = X1 \quad (3a)$$

$$Y2 = R1 \times \cos\theta 1 \quad (3b)$$

$$Z2 = R1 \times \sin\theta 1 \quad (3c)$$

In addition, symbol "θ1" is a value which is to be acquired by Formula (2b), and represents the angle to object 40, viewed from first camera 10 in the cylindrical coordinate system.

Figure 7:
FIG. 7 is an image after the characteristic is transformed.

In the above-described first embodiment, since the paralleling step makes Epipolar lines EP of first and second images 41 and 42 to be consistent with each other the first and second advantages can be maintained, as described in the previous background description. Further, since the correcting step corrects any distortions of first and second images 41 and 42, even though the characteristic is transformed, the central portions of first and second images 41 and 42 are prevented from being excessively reduced, while the side portions are prevented from being excessively enlarged (see FIG. 7). Accordingly, the first embodiment can acquire a wide angle image, in which the space can be three-dimensionally realized, while the above-described first and second advantages are maintained.

[Second Embodiment]

The second embodiment of "the wide-angle image acquiring method" of the present invention will now be detailed. The second embodiment differs from the first embodiment, concerning some points detailed below, however, the second embodiment is equal to the first embodiment, concerning other than said points.

Wide-angle stereo camera device 1, relating to the second embodiment, employs well-known standard lenses as first and second lenses 11 and 21, instead of the wide-angle lenses.

Figure 4:
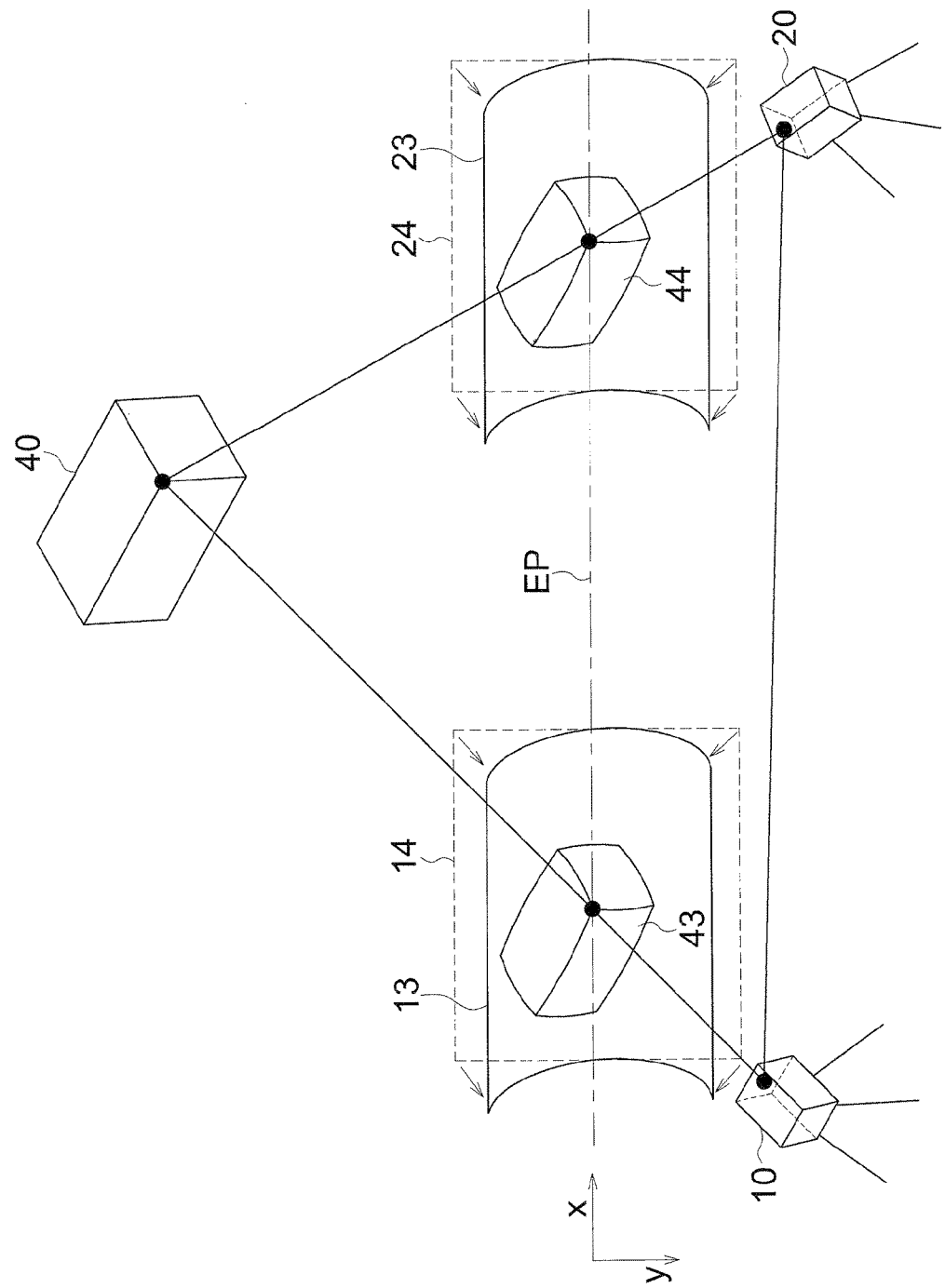
FIG. 4 is a drawing to detail the wide-angle image acquiring method relating to the second embodiment.
Figure 5:
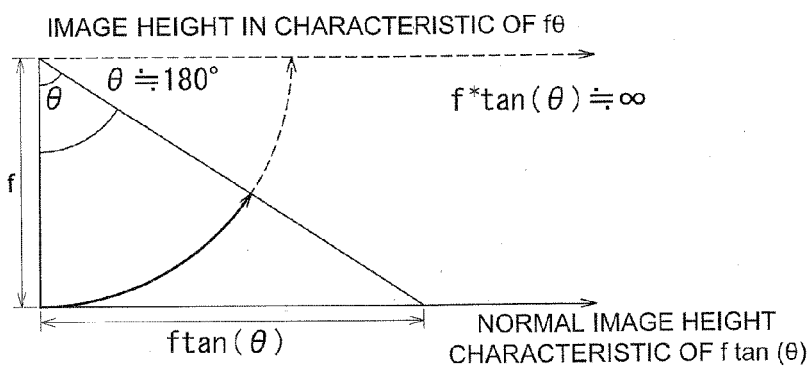
FIG. 5 is a drawing to detail the lens characteristic.
Figure 6:
FIG. 6 is an example to show an image photographed by a fish eye lens (which is an actual photograph).

In the wide-angle image acquiring method relating to the second embodiment, as the same way as in the case of the first embodiment, the image capturing step, the paralleling step, the correcting step, the searching step and the reconstruction step are conducted, however, as shown in FIG. 4, first and second images 43 and 44, acquired via the image capturing step and the paralleling step, were photographed by first and second lenses 11 and 21, each formed of a standard lens, whereby first and second images 43 and 44 represent images, projected on flat image capturing surface 14 and 24 (see the dotted line in FIG. 4).

In the correcting step, coordinates [x, y] of not-yet corrected first and second images 43 and 44 are transformed into coordinates [x″, y″], based on Formula (4) which is shown below. As a result, first and second images 43 and 44, having been projected on flat image capturing surface 14 and 24, can be projected onto cylindrical image capturing surfaces 13 and 23 (see the solid lines in FIG. 4).

[Formula 2]

$$\begin{bmatrix} x'' \\ y'' \end{bmatrix} = \begin{bmatrix} x \frac{f}{y} \tan \frac{y}{f} \\ f \tan \frac{y}{f} \end{bmatrix} \quad (4)$$

In the reconstruction step, when the three-dimensional coordinates (being the cylindrical coordinates) of object 40 is represented as [X3, θ3, R3], viewed from first camera 10 (see FIG. 3), each coordinate value is calculated by Formulas (5a)-(5c), which are shown below. "R3" in Formula (5c) represents the distance between object 40 and first camera 10 in the cylindrical coordinate system.

$$X3 = x''/f \times R3 \quad (5a)$$

$$\theta3 = y''/f \times R3 \quad (5b)$$

$$R3 = b \times f/d'' \quad (5c)$$

Symbols "x″" and "y″" represent the coordinate values after the correcting step, while "d″" represents the amount of positional disagreement between first image 43 and second image 44.

When said cylindrical coordinates [X3, θ3, R3] are to be represented by normally used orthogonal coordinates [X4, Y4, Z4] (see FIG. 3), each coordinate value is calculated by Formulas (6a)-(6c), which are shown below. "Z4" in Formula (6c) represents the distance between object 40 and first camera 10 in the orthogonal coordinate system $$X4 = X3 \quad (6a)$$

$$Y4 = R3 \times \cos \theta3 \quad (6b)$$

$$Z4 = R3 \times \sin \theta3 \quad (6c)$$

In addition, "θ3" shown in Formulas (6b) and (6c) is a value which is acquired by Formula (5b), and is the angle to object 40, viewed from first camera 10 in the cylindrical coordinate system.

In the above-described second embodiment, since the paralleling step makes Epipolar lines EP of first and second images 43 and 44 to be consistent with each other, the first and second advantages can be maintained, as described in the previous background description. Further, since the correcting step corrects any distortions of first and second images 43 and 44, even though the characteristic is transformed, the central portions of first and second images 43 and 44 are prevented from being excessively reduced, while the side portions are prevented from being excessively enlarged. Accordingly, the second embodiment can acquire a wide angle image, in which the space can be three-dimensionally realized, while the above-described first and second advantages are maintained.

In addition, the present invention is not limited to the first and second embodiments, and various improvements and design changes can be appropriately conducted within the scope of this invention, as long as they do not deviate from the contents of the present invention.

Regarding items of said improvements and design changes, since optical systems, such as first and second lenses 11 and 21, are employed in first and second cameras 10, and 20, distortion is inevitably generated, so that perfect characteristic of fθ, and perfect characteristic of f tan θ cannot be realized, whereby, in the correcting step, the well-known correction for the distortion may be conducted, to be added to the projection having been conducted onto the cylindrical image capturing surface, and further, first and second images 41-44 may be enlarged or reduced by the well-known methods.

The invention claimed is:

1. A wide-angle image acquiring method, which photographs an object while using a first camera and a second camera, to acquire a first image and a second image, and which acquires a wide-angle image of the object while using the first image and the second image, comprising:
   a step of paralleling an Epipolar line of the first image with an Epipolar line of the second image, so that the Epipolar lines are made consistent with each other;
   a step of correcting distortions of the first image and the second image, each projected on a cylindrical imaging surface;
   a step of searching for a point which corresponds to an observing point on the first image, on the Epipolar line of the second image; and
   a step of reconstructing a three-dimensional figure of the object, after acquiring distances in a depth direction from the first and the second cameras to the object, based on a searched result of the step of searching,
   wherein in the step of reconstructing the three-dimensional figure of the object, when the distance between the first camera and the object is represented by R1 in a cylindrical coordinate system, said distance R1 is calculated by the formula shown below, $$R1 = b \times f/d'$$

in which formula, "b" represents the distance between the first camera and the second camera, "f" represents the focal length of the first camera and the second camera, and "d" represents the positional disagreement between the first image and the second image.

2. The wide-angle image acquiring method of claim 1, wherein in the step of reconstructing the three-dimensional figure of the object, when the distance between the first camera and the object is represented by Z2 in an orthogonal coordinate system, distance Z2 is calculated by the formula shown below, $$Z2 = R1 \times \sin \theta 1$$

in which formula, "θ1" represents an angle, viewed from the first camera.

3. A wide-angle stereo camera device, which photographs an object to acquire a first image and a second image, while using a first camera and a second camera, and which acquires a wide-angle image of the object, while using the first image and the second image, comprising a physical processor to execute one or more instructions operable to:

parallel an Epipolar line of the first image with an Epipolar line of the second image, so that the Epipolar lines are made consistent with each other;

correct distortions of the first image and the second image, each projected onto an cylindrical imaging surface;

search a point which corresponds to an observing point of the first image on the Epipolar line of the second image; and reconstruct a three-dimensional figure of the object, after acquiring distances in the depth direction from the first and the second cameras toward the object, based on a searched result of the searching section, wherein when the distance between the first camera and the object is represented by R1 in the cylindrical coordinate system, the physical processor calculates distance R1, using the formula shown below, $$R1 = b \times f/d'$$

in which formula, "b" represents the distance between the first camera and the second camera, "f" represents the focal length of the first camera and the second camera, and "d" represents the positional disagreement between the first image and the second image.

4. The wide-angle stereo camera device of claim 3, wherein when the distance between the first camera and the object is represented by Z2 in an orthogonal coordinate system, the one or more instructions being further operable to:

calculate distance Z2, using the formula shown below, $$Z2 = R1 \times \sin \theta 1$$

in which formula, "θ1" represents the angle viewed from the first camera.

* * * * *